United States Patent
Dubbaka et al.

(10) Patent No.: US 10,186,283 B2
(45) Date of Patent: Jan. 22, 2019

(54) METHODS OF FORMING NEAR FIELD TRANSDUCERS (NFTS) AND PORTIONS THEREOF

(71) Applicant: SEAGATE TECHNOLOGY LLC, Cupertino, CA (US)

(72) Inventors: Sridhar Dubbaka, Eden Prairie, MN (US); YongJun Zhao, Eden Prairie, MN (US); David Michael Grundman, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/938,264

(22) Filed: Nov. 11, 2015

(65) Prior Publication Data

US 2016/0133275 A1    May 12, 2016

Related U.S. Application Data

(60) Provisional application No. 62/078,125, filed on Nov. 11, 2014.

(51) Int. Cl.
| | | |
|---|---|---|
| *H01L 21/311* | (2006.01) | |
| *G11B 5/31* | (2006.01) | |
| *G11B 5/00* | (2006.01) | |

(52) U.S. Cl.
CPC ...... *G11B 5/314* (2013.01); *G11B 2005/0021* (2013.01)

(58) Field of Classification Search
CPC ........... H01L 21/3205; H01L 21/32051; H01L 21/311
USPC .................................................. 430/315, 317
See application file for complete search history.

(56) References Cited

U.S. PATENT DOCUMENTS

| | | | | |
|---|---|---|---|---|
| 2014/0374376 A1* | 12/2014 | Jayashankar | .......... | G11B 5/314 216/22 |
| 2015/0072593 A1* | 3/2015 | Zhao | ....................... | B24B 49/10 451/1 |

* cited by examiner

*Primary Examiner* — Daborah Chacko-Davis
(74) *Attorney, Agent, or Firm* — Mueting, Raasch & Gebhardt, P.A.

(57) ABSTRACT

A method of forming a peg of a NFT, the peg having a tapered portion, the method including depositing a layer of dielectric material; forming a three dimensional shape from at least a portion of the dielectric material the three dimensional shape having two side surfaces and two end surfaces; and depositing plasmonic material on at least one side surface of the three dimensional shape of dielectric material, wherein the plasmonic material deposited on the at least one side surface forms the tapered portion of the peg.

20 Claims, 7 Drawing Sheets

METHODS OF FORMING NEAR FIELD TRANSDUCERS (NFTS) AND PORTIONS THEREOF

PRIORITY

This application claims priority to U.S. Provisional Application No. 62/078,125 entitled METHODS OF FORMING OF NEAR FIELD TRANSDUCER (NFT) AND NFT FORMED THEREBY filed on Nov. 11, 2014, the disclosure of which is incorporated herein by reference thereto.

SUMMARY

Disclosed are methods of forming a peg of a NFT, the peg having a tapered portion, the method including depositing a layer of dielectric material; forming a three dimensional shape from at least a portion of the dielectric material the three dimensional shape having two side surfaces and two end surfaces; and depositing plasmonic material on at least one side surface of the three dimensional shape of dielectric material, wherein the plasmonic material deposited on the at least one side surface forms the tapered portion of the peg.

Also disclosed are methods of forming a peg, the peg having a tapered portion, the methods including depositing a layer of dielectric material; forming a three dimensional shape from at least a portion of the dielectric material the three dimensional shape having two side surfaces, two end surfaces, a top surface and a bottom surface, wherein at least one of the side surfaces has an angle from the top surface from about 30° to about 60°; depositing plasmonic material on at least the one side surface with the angle from about 30° to about 60°, wherein the plasmonic material deposited on the at least one side surface forms the tapered portion of the peg; and forming a complete NFT, the complete NFT comprising the tapered portion of the peg.

Also disclosed are methods of forming a peg, the peg having a tapered portion, the methods including depositing a layer of dielectric material; forming a three dimensional shape from at least a portion of the dielectric material the three dimensional shape having two side surfaces, two end surfaces, a top surface and a bottom surface, and the top surface has a top width and the bottom surface has a base width, and the base width is larger than the top width; depositing plasmonic material on at least one of the side surfaces wherein the plasmonic material deposited on the at least one side surface forms the tapered portion of the peg; and forming a complete NFT, the complete NFT comprising the tapered portion of the peg.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIGS. 4A to 4E show cross-sections of structures at various stages of manufacture according to disclosed methods.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The thermal gradient of the peg is an important indicator of quality and reliability of NFT structures.

Figure 1:
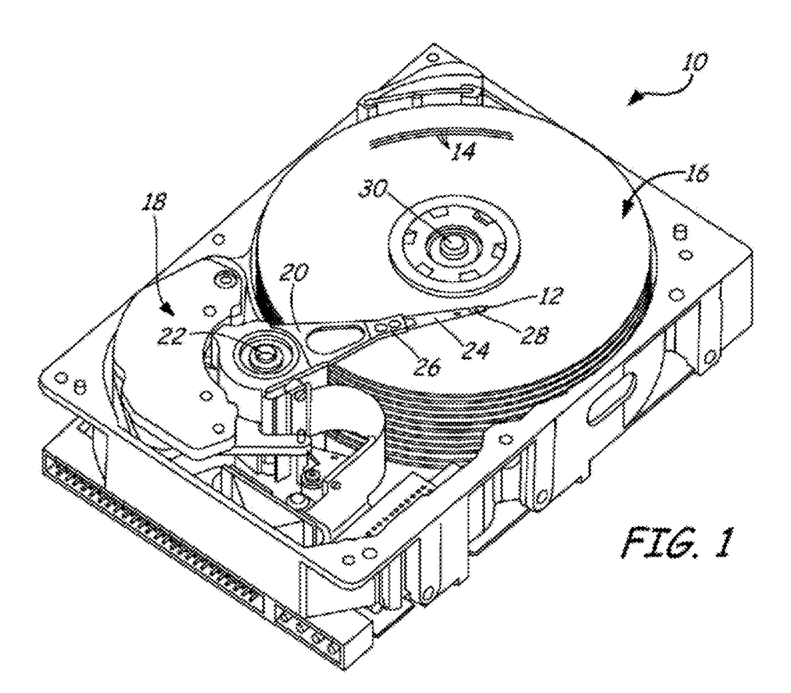
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
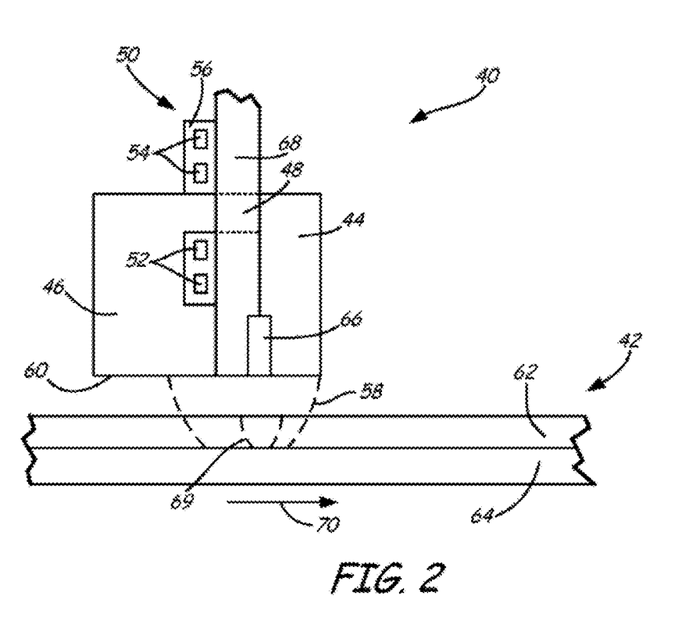
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

Figure 3A:
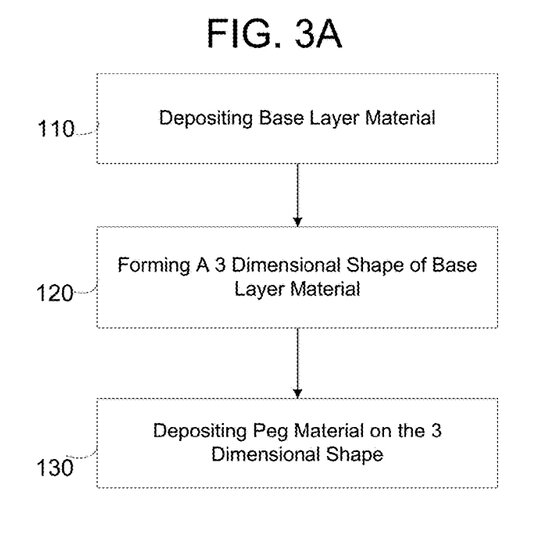
FIG. 3A depicts an illustrative embodiment of disclosed methods.

Illustrative embodiments of methods are depicted in FIG. 3A. FIG. 3A shows a method that includes at least three steps, step 110 depositing a base layer material, step 120 forming a three dimensional shape of base layer material, and step 130 depositing peg material on the three dimensional shape of base layer material.

Figure 4A:
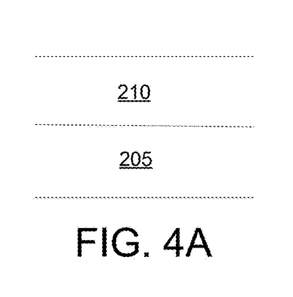

The base layer material can include a layer, material or structure that may ultimately function as cladding. The base layer material can be deposited on any type of structure or substrate. The structure or substrate could include additional layers, structures or devices. In some embodiments, the base layer material could be deposited on a structure that includes or is configured to ultimately include other layers, structures or devices that may function in a HAMR device. FIG. 4A shows a cross-section of a portion of a structure after a base material layer 210 has been formed on an underlying structure 205.

In some embodiments, the base layer material may include a dielectric material. In some embodiments, the dielectric material may be one that has a low (relative to the material of the NFT) index of refraction. Illustrative materials can include $Ta_2O_5$ (also referred to as TaOx), $Al_2O_3$ (also referred to as AlOx), $SiO_2$ (also referred to as SiOx), MgO, MgF2, $Si_3N_4$, SiON, and $TaSiO_x$. Materials disclosed in U.S. Patent Publication No. 2011/0205864, entitled "Optical Waveguide Clad Material", filed Feb. 23, 2011, the disclosure of which is incorporated herein by reference thereto to the extent it does not conflict, can also be utilized as the base layer material. In embodiments, the base layer material can include $Al_2O_3$ (AlOx) or $SiO_2$ (SiOx) for example.

The base layer material can be deposited using any method, processes, or combinations of methods and/or processes. Illustrative processes can include for example, deposition methods such as chemical vapor deposition (CVD), physical vapor deposition (PVD), atomic layer deposition (ALD), plating (e.g., electroplating), sputtering methods, cathodic arc deposition methods, and evaporative methods. In some embodiments, the base layer material, may be deposited using ALD.

The base layer material may be deposited to any thickness. In some embodiments, base layer material may have a thickness not less than 50 nm, not less than 60 nm, or not less than 65 nm. In some embodiments, base layer material may have a thickness not greater than 100 nm, not greater than 90 nm, or not greater than 85 nm. In some embodiments, the base layer material may be deposited to a thickness of about 70 nm, or about 80 nm, for example.

A next step may include forming a three dimensional shape from the base layer material. At least some of the deposited thickness of the base layer material may be utilized to form a three dimensional shape. In some embodiments, not the entire thickness is utilized to form the three dimensional shape. It should also be noted that the three dimensional shape need not encompass the entire expanse of the deposited base layer material.

In some embodiments, the three dimensional shape that is formed includes at least one side wall that has an angle formed at the top of the shape that is less than 90°. In some embodiments, the three dimensional shape can be substantially that of a trapezoid. In some embodiments, the three dimensional shape can be substantially that of an isosceles trapezoid. By substantially that of a trapezoid, it is meant that the side walls need not be entirely planar. In some embodiments of the method, the three dimensional shape is formed by a milling process. Milling processes may not be able to or may not be enlisted to form perfectly planar surfaces, especially end surfaces and side surfaces, of the shape in that there may be some curvature to the surfaces.

Figure 3B:
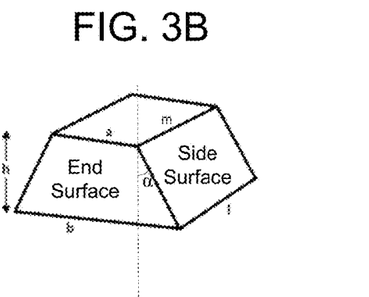
FIG. 3B illustrates an isosceles trapezoid.

FIG. 3B illustrates a possible three dimensional shape, an isosceles trapezoid. The three dimensional shape could also be substantially the same as an isosceles trapezoid. The isosceles trapezoid has two end surfaces (one of which can be seen and is labeled as such in FIG. 3B), and two side surfaces (one of which can be seen and is labeled as such in FIG. 3B). As seen in FIG. 3B, the side surface visible in the figure has an angle formed at the top of the shape, $\alpha$, that is less than 90°. In some embodiments, the angle, $\alpha$, is not less than 30°, or not less than 40°. In some embodiments, the angle, $\alpha$, is not greater than 60°, or not greater than 50°. In some embodiments, the angle $\alpha$, can be about 45°.

The isosceles trapezoid also includes a height, h, a base width, b, a top width, a, a base length, l and a top length, m. In some embodiments, where the three dimensional shape is an isosceles trapezoid, the height, h, of the trapezoid may be dependent, at least in part on the desired thickness of the peg being formed. In some embodiments, the height, h, of the trapezoid can be smaller or equal to the desired peg thickness. In some embodiments, the height, h of the trapezoid can be not less than 15 nm smaller than the desired peg thickness and not greater than the desired peg thickness. In some embodiments where a peg will be made of gold (Au), a peg thickness can be from 20 nm to 30 nm (e.g., about 25 nm), and where it will be made of rhodium (Rh), a peg thickness can be from 40 nm to 50 nm (e.g., about 45 nm). In some embodiments, a height, h, can be The length l, of the trapezoid and the top length m are dependent on each other with l being a function of m. The top length, m, can be considered a starting point and may typically be defined lithographically. In some embodiments, m can be 500 nm (or anywhere from 300 nm to 700 nm or 400 nm to 600 nm) to account for the horizontal dimension of the disc of the NFT (e.g., this can usually be close to 400 nm wide). Furthermore, the dimension m can be chosen with consideration of the constraints of critical dimension (CD) scanning electron microscopy (SEM) metrology using small field of view images. In typical circumstances where a rotational mill is utilized for definition of the bottom taper the length, l, is typically larger that the top length, m. In typical circumstances were a static mill is utilized for the bottom taper definition, l and m are typically substantially equivalent or substantially the same (the static mill is typically done perpendicular to the edge of the top edge (with the dimension m) and at an angle of about 90°).

The isosceles trapezoid also has a top width, a, and a base width, b. The top width, a and the base width, b are dependent on each other with b being a function of a. The top width, a, can be considered a starting point and may typically be defined lithographically. In some embodiments, a can be 250 nm (or anywhere from 200 nm to 500 nm or 225 nm to 275 nm) since it is large enough to lithographically define a straight edge. Furthermore, the dimension a can be chosen with consideration of the constraints of critical dimension (CD) scanning electron microscopy (SEM) metrology using small field of view images. In typical circumstances where either a static mill or a rotational mill is utilized to define the bottom taper, the base width, b, is typically larger that the top width, a (the static mill is typically done perpendicular to the edge of the top edge (with the dimension m) and at an angle of about 90°).

Various methods can be utilized to form the three dimensional shape. Such methods can include, for example photolithography methods or processes (e.g., deposition of photoresist, exposure of the photoresist material and development of the exposed photoresist material) and removal methods (e.g., milling such as ion milling or more specifically ion-beam milling, chemical mechanical polishing (CMP), etc.). In some embodiments, a deposited base layer material may be formed into a three dimensional shape by forming a photoresist cuboid (e.g., using deposition of photoresist, exposure of the photoresist material and development of the exposed photoresist material) over the base layer material where the three dimensional shape is ultimately to be formed. The photoresist cuboid can have base dimensions that are substantially the same size as the top surface of the three dimensional structure is desired (e.g., top width, a, x top length, m).

In some embodiments, the photoresist can optionally be utilized with additional layers to enhance or better control the removal of the underlying base material. Additionally, optional layers can be deposited before the photoresist to enhance the adhesion of the photoresist (and thereby produce more controllable milling results) to the underlying structure. Such additional layers can include amorphous carbon, hard mask (e.g., SiO$_2$ or TaN), or others. A specific example of such additional optional layers can include, for example a layer (e.g., having a thickness of 15 nm) of ruthenium could be deposited directly on the base material (e.g. dielectric) and then an amorphous layer of carbon (aC) (e.g., having a thickness of 50 nm) could be deposited on the ruthenium. In some embodiments, use of the additional adhesion enhancement layers, specific types of photoresist, or any combination thereof may serve to enhance the milling process to produce a sidewall that is more planar.

Next, a milling method, e.g., ion-beam milling can be utilized to remove some thickness of the base layer material except for that base layer material protected by the photoresist cuboid. The conditions of milling can be utilized to control the depth of the base material layer that is removed, the angles of the side and end surfaces of the trapezoid (e.g., α in FIG. 3B), the planarity of the side and end surfaces, other characteristics, and combinations thereof. The milling method utilized can be a rotation mill, a static mill, or any combination thereof, for example. After the trapezoid has been formed from the base layer material, the photoresist cuboid can then be stripped away. A three dimensional shape, for example substantially that of a trapezoid, or even more specifically substantially that of an isosceles trapezoid, of the base layer material then exists. This three dimensional shape can optionally exist on a portion of the originally deposited layer of the base layer material.

In some optional embodiments of methods, the base layer material may be deposited in two layers with an etch/mill stop layer between the two layers. This etch/mill stop layer could be utilized to better control the removal of the photoresist cuboid that covers the top of the three dimensional shape, better control the sidewalls of the three dimensional shape, better control and render more efficient the milling process, or any combination thereof. In some embodiments, the optional mill stop layer could include, for example a thin (e.g., not greater than 5 nm, not greater than 4 nm, or about 3 nm) layer of tantalum oxide (TaOx) or any material that has a relatively considerably different mill rate than that of the base material (e.g., AlOx in some embodiments). Various known processes, devices or both can be utilized to control the milling using an etch/mill stop layer. In some specific illustrative embodiments, 30 nm of base material (e.g., AlOx) could be deposited, a 3 nm layer of mill stop layer (e.g., TaOx) could be deposited and an additional 40 nm base material (e.g., AlOx) could then be deposited thereon. It should also be noted that the two materials of the base material need not be the same material.

Figure 4B:
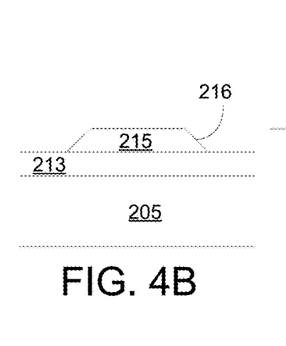

FIG. 4B shows a cross-section of a portion of a structure after a portion of the base material layer 210 of FIG. 4A has been converted into a three dimensional structure 215. As seen in FIG. 4B, some of the base material layer can remain as an underlying layer 213. The three dimensional shape 215 includes at least one side wall 216.

Optionally, after the three dimensional shape of base layer material has been formed, an adhesion layer could be deposited on the three dimensional shape. An optional adhesion layer can function to better maintain adhesion between the base layer material (e.g., a dielectric material such as an oxide) and the peg material (e.g., a plasmonic material such as gold, silver, copper, rhodium, etc.). Any material that can enhance or increase adhesion between the two can be deposited. Additionally, or optionally, any process that can enhance or increase adhesion between the two can be carried out before deposition of the peg material.

Once the three dimensional shape has been formed from the base layer material, the next step (step 130 in FIG. 3A) can include depositing peg material on at least one side surface of the three dimensional shape. In some embodiments, the peg material can be sheet deposited over the entire field. The peg material can include plasmonic materials, for example. In some embodiments, various materials including, for example, gold (Au), silver (Ag), aluminum (Al), copper (Cu), ruthenium (Ru), rhodium (Rh), iridium (Ir), or alloys thereof; titanium nitride (TiN), zirconium nitride (ZrN), or combinations thereof; thermally conductive oxides; indium tin oxide (ITO); and combinations thereof. In NFTs made of materials having relatively low oxidation resistance (e.g., Rh, TiN, ZrN, etc.), oxidation of the NFT may lead to loss of functionality of the NFT. In such embodiments, gas barrier properties become even more important. In some embodiments, illustrative NFT materials can also include those disclosed in U.S. Patent Publication No. 2013/0286799; and U.S. Pat. Nos. 8,830,800, 8,427,925, and 8,934,198; the disclosures of which are incorporated herein by reference thereto.

Figure 4C:
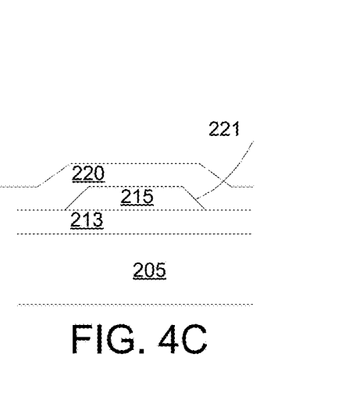

The peg material can be deposited using any method, processes, or combinations of methods and/or processes. Illustrative processes can include for example, deposition methods such as chemical vapor deposition (CVD), physical vapor deposition (PVD), atomic layer deposition (ALD), plating (e.g., electroplating), sputtering methods, cathodic arc deposition methods, and evaporative methods. In some embodiments, the peg material, may be deposited using ALD. FIG. 4C shows a cross-section of a portion of a structure after a sheet of peg material 220 has been formed over at least the three dimensional structure 215. As seen in FIG. 4C, some of the peg material 220 can be deposited on the underlying layer 213 as well. Deposition of the peg material 220 on the at least one side wall 216 or side surface forms a tapered portion 221 of the peg material that faces the side wall 216. It should be noted that at this point, the tapered portion of the peg has already been formed. Additional steps in disclosed methods can be utilized to form other portions of the peg or other portions of the NFT, prepare other surfaces of the device for further processing, or combinations thereof.

Optionally, once the peg material has been deposited on at least the side surface or side wall of the three dimensional shape of base material, some portion of the deposited peg material can be selectively removed. For example, the area directly over at least the tapered wall of the peg can be covered with photoresist to protect it and at least some of the peg material in other areas can be removed.

Figure 4D:
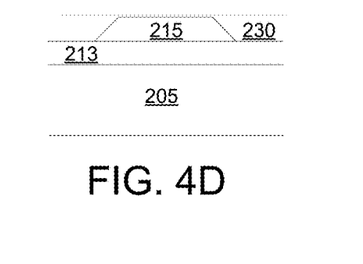
Figure 4E:
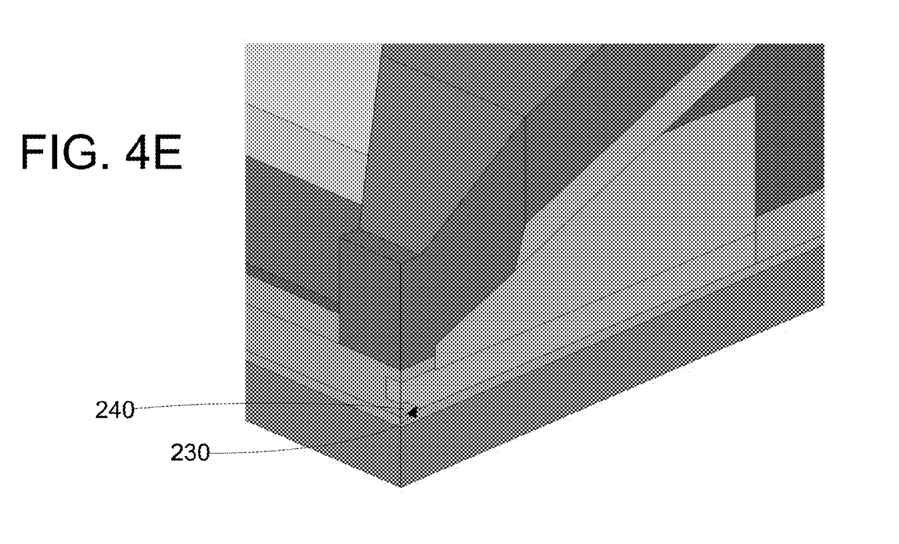
FIG. 4E shows a perspective view of an embodiment of a peg in a larger structure.

An illustrative process of removing at least some of the deposited peg material can include forming a photoresist cuboid over at least the tapered wall of the peg, depositing an amorphous carbon layer on the field to provide a stop for CMP. Then, the photoresist can be removed leaving an elevated portion of the peg material (over the three dimensional shape of the base material). The elevated portion of the peg material can then be removed via CMP using the amorphous carbon as a stop. The excess amorphous carbon can then be ashed away. FIG. 4D shows a cross-section of a portion of a structure after ashing the amorphous carbon. As seen in FIG. 4D, the peg material forms a tapered peg 230 adjacent the three dimensional shape 215. The three dimensional representation of a larger device shows a tapered peg 230 in the context of the device. The material below the tapered point of the peg 230 is the three dimensional shape 215 (seen in FIGS. 4A to 4D), which in the larger device can function as the core to NFT space (CNS) 240.

Additional steps can then be carried out to form the remainder of the NFT and the remainder of the device. The above discussed methods and processes could be easily integrated into an overall manufacturing process of a device.

Figure 5A:
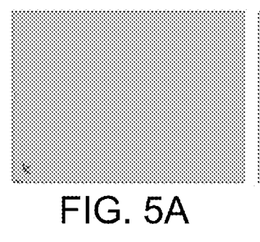
FIGS. 5A to 5L show structures at various stages of illustrated embodiments of disclosed methods.
Figure 5B:
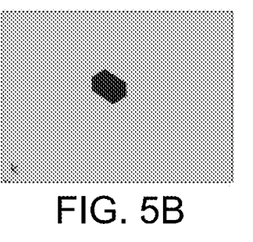
Figure 5C:
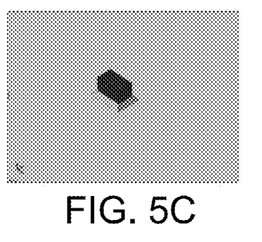
Figure 5D:
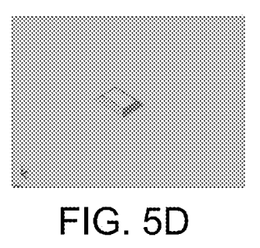
Figure 5E:
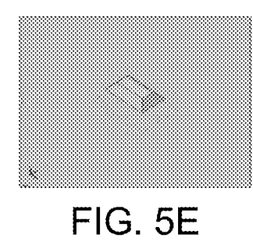
Figure 5F:
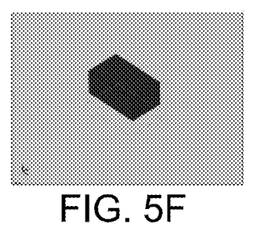
Figure 5G:
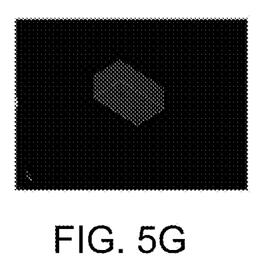
Figure 5H:
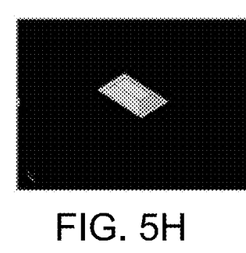
Figure 5I:
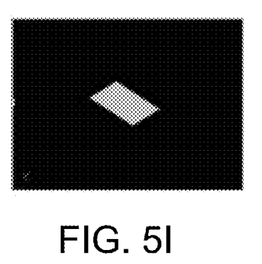
Figure 5J:
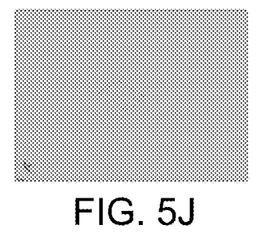
Figure 5K:
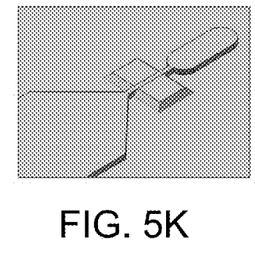
Figure 5L:
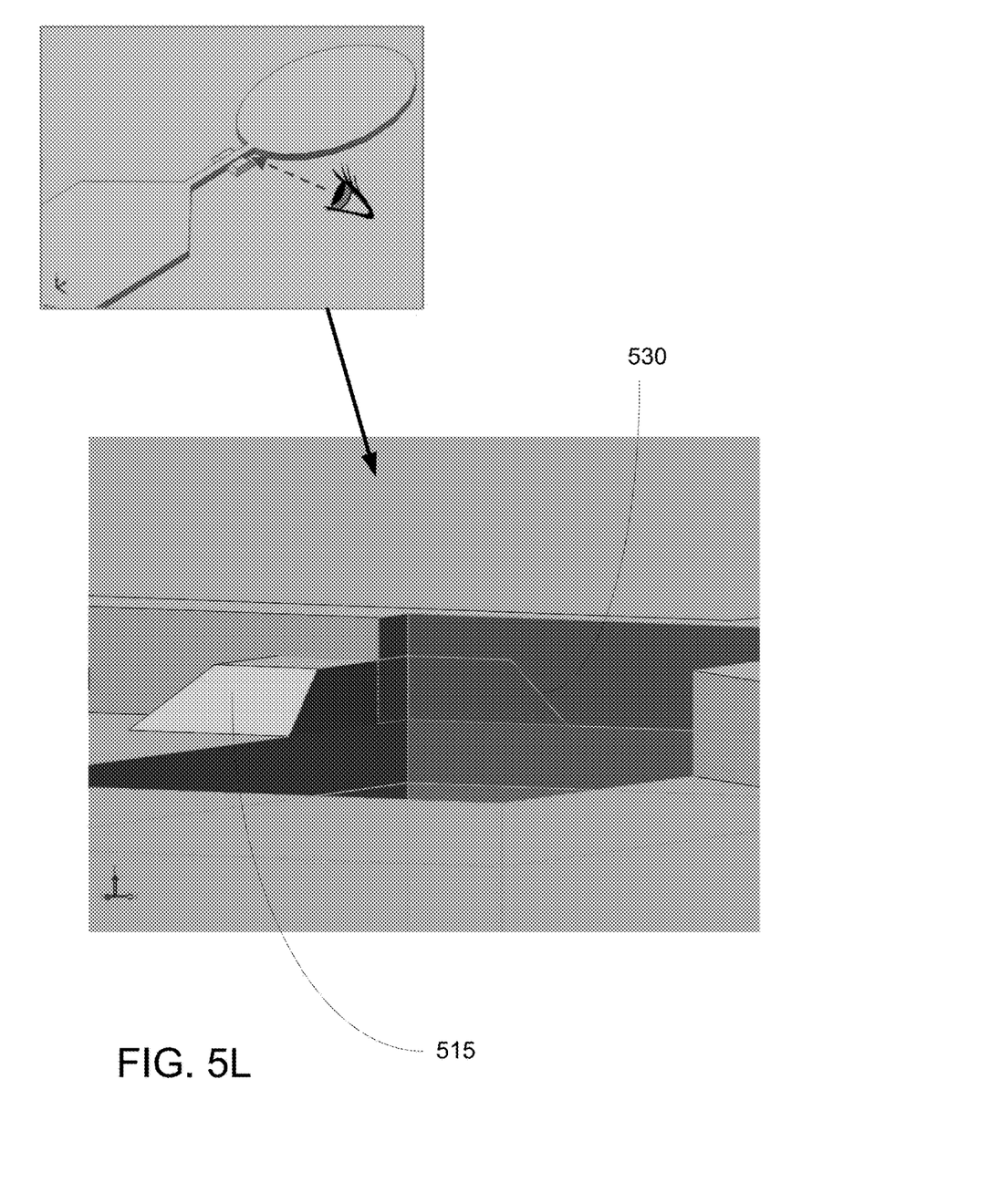

FIGS. 5A to 5K show a device at various stages of an illustrative process. Specifically, FIG. 5A shows a layer of AlOx deposited. FIG. 5B shows a photoresist cuboid formed on the AlOx layer. FIG. 5C shows the structure after a portion of the AlOx layer has been removed via ion milling with the photoresist cuboid protecting and forming a three dimensional shape in the AlOx layer. In FIG. 5D, the photoresist cuboid has been removed leaving the three dimensional shape exposed. In FIG. 5E, a sheet of peg material, e.g., gold (Au) has been deposited over the field creating a portion of the gold over the three dimensional shape that extends upward. In FIG. 5F, a photoresist cuboid has been formed over at least the upwardly extending gold portion. In FIG. 5G, an amorphous carbon layer has been deposited over the entire surface (with the exception of the photoresist cuboid or it has been previously selectively removed from the surface of the photoresist cuboid). In FIG. 5H, the photoresist cuboid has been removed. In FIG. 5I, the upwardly extending peg material has been removed by chemical mechanical polishing (CMP) for example. In FIG. 5J, a planar layer of peg material exists everywhere in the field. FIG. 5J also shows the underlying three dimensional shape of the base material. In FIG. 5K, the entire peg and disc of a NFT have been formed from the planar layer of gold. FIG. 5L shows a close up cut out of the portion of the device that includes the tapered peg 530 and the three dimensional shape of the base material 515.

Figure 6A:
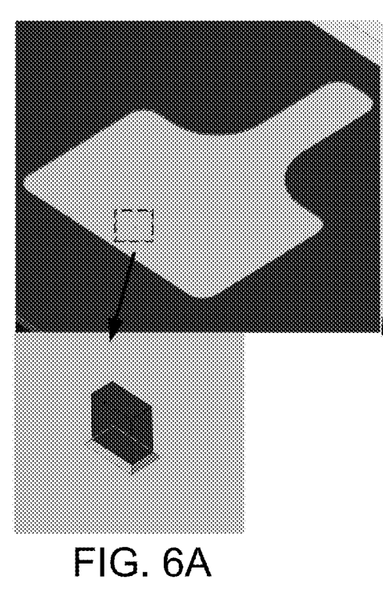
FIGS. 6A to 6F show structures at various stages of illustrated embodiments of disclosed methods.
Figure 6B:
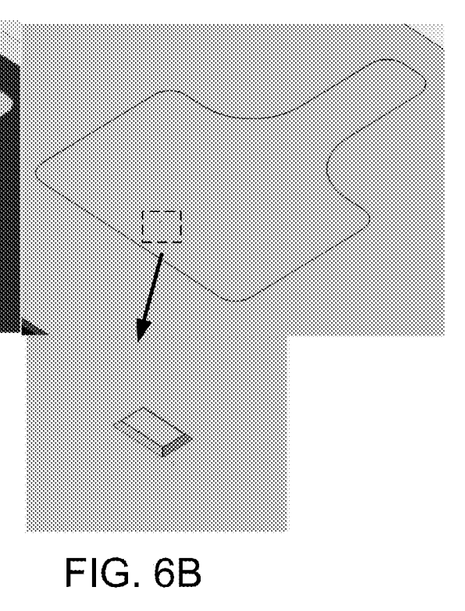
Figure 6C:
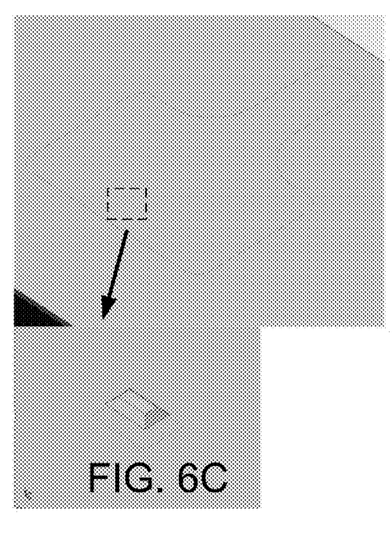
Figure 6D:
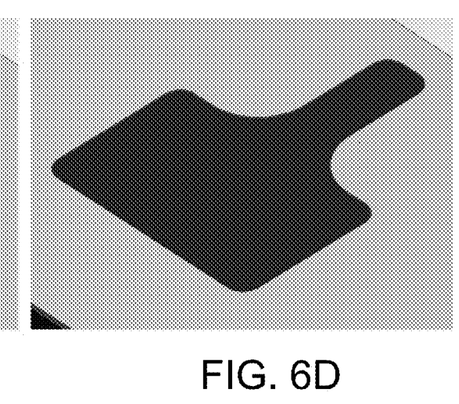
Figure 6E:
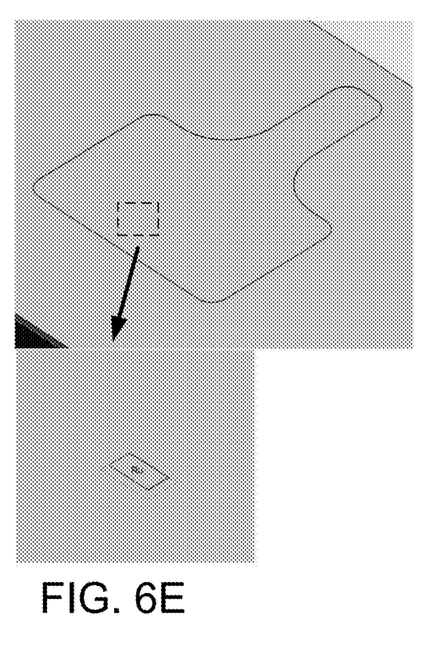
Figure 6F:
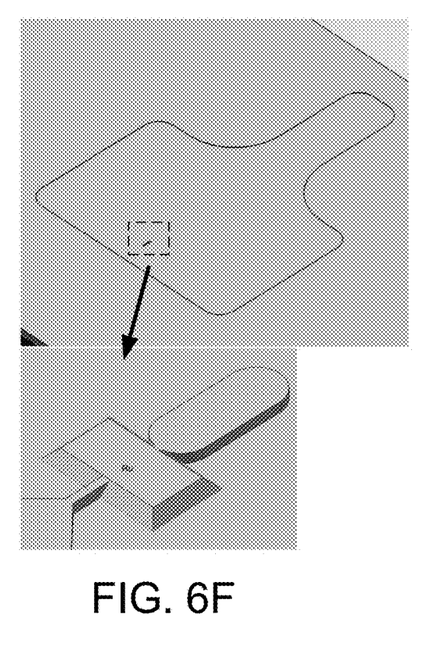

FIGS. 6A to 6F show a structure at various stages of an illustrative process. Specifically, FIG. 6A shows a device with a base layer (80 nm AlOx) that has been covered by a photoresist cuboid to form a three dimensional shape via ion milling. FIG. 6B shows the structure after the photoresist cuboid has been removed. FIG. 6C shows the structure after a sheet of plasmonic material has been deposited thereon. FIG. 6D shows the structure after a portion thereof has been protected by photoresist. FIG. 6E shows the structure after the plasmonic material has been removed from the unprotected area and a ruthenium (Ru) layer has been exposed after an amorphous carbon layer had been ashed away. FIG. 6F shows the structure after the entire peg and disc of a NFT have been formed.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of methods of forming near field transducers (NFTs) and portions thereof are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of forming a peg of a NFT, the peg comprising a tapered portion, the method comprising:
    depositing a layer of dielectric material on a substrate;
    depositing a photoresist material on the layer of dielectric material;
    forming a photoresist mask from a portion of the photoresist material;
    forming a three dimensional shape on the substrate from at least a portion of the dielectric material by utilizing at least the photoresist mask to protect at least a portion of the dielectric material, the three dimensional shape having two side surfaces and two end surfaces; and
    depositing plasmonic material on at least one side surface of the three dimensional shape of dielectric material, wherein the plasmonic material deposited on the at least one side surface forms the tapered portion of the peg.

2. The method according to claim 1, wherein the at least one side wall has an angle, α, from the top of the three dimensional shape and the angle, α, is less than 90°.

3. The method according to claim 2, wherein the angle α is from about 30° to about 60°.

4. The method according to claim 2, wherein the three dimensional shape also has a top surface with a top width and a bottom surface with a base width, and the base width is larger than the top width.

5. The method according to claim 1, wherein the step of depositing the dielectric material comprises chemical vapor deposition (CVD), physical vapor deposition (PVD), atomic layer deposition (ALD), plating, sputtering methods, cathodic arc deposition methods, evaporative methods, or any combination thereof.

6. The method according to claim 1, wherein the step of depositing the dielectric material comprises ALD.

7. The method according to claim 1, wherein the dielectric material has a thickness from about 50 nm to about 100 nm.

8. The method according to claim 1, wherein forming the photoresist mask comprises exposing a portion of the photoresist material layer and developing the exposed portion of the photoresist material.

9. The method according to claim 1 further comprising depositing a layer on the dielectric material before depositing the photoresist material layer to control the adhesion of the photoresist material to the dielectric material.

10. The method according to claim 1, wherein the step of depositing the plasmonic material comprises chemical vapor deposition (CVD), physical vapor deposition (PVD), atomic layer deposition (ALD), plating, sputtering methods, cathodic arc deposition methods, evaporative methods, or any combination thereof.

11. The method according to claim 1, wherein the step of depositing the plasmonic material comprises ALD.

12. The method according to claim 1 further comprising forming a complete NFT.

13. The method according to claim 1 further comprising forming an adhesion layer on the three dimensional shape of the dielectric material before depositing the plasmonic material.

14. The method according to claim 1, wherein the layer of dielectric material further comprises a multilayer structure comprising a first dielectric layer, a mill stop layer and a second dielectric layer, and wherein the three dimensional shape is formed from the second dielectric layer.

15. A method of forming a peg, the peg comprising a tapered portion, the method comprising:
    depositing a layer of dielectric material on a substrate;
    depositing a photoresist material on the layer of dielectric material;
    forming a photoresist mask from a portion of the photoresist material;
    forming a three dimensional shape on the substrate from at least a portion of the dielectric material by utilizing the photoresist mask to protect at least a portion of the dielectric material, the three dimensional shape having two side surfaces, two end surfaces, a top surface and a bottom surface, wherein at least one of the side surfaces has an angle from the top surface from about 30° to about 60°;
    depositing plasmonic material on at least the one side surface with the angle from about 30° to about 60°, wherein the plasmonic material deposited on the at least one side surface forms the tapered portion of the peg; and
    forming a complete NFT, the complete NFT comprising the tapered portion of the peg.

16. The method according to claim 15, wherein the step of depositing the dielectric material comprises ALD.

17. The method according to claim 15, wherein the dielectric material has a thickness from about 50 nm to about 100 nm.

18. The method according to claim 15, wherein the step of forming the three dimensional shape comprises ion beam milling.

19. A method of forming a peg, the peg comprising a tapered portion, the method comprising:
    depositing a layer of dielectric material on a substrate;
    depositing a photoresist material on the layer of dielectric material;
    forming a photoresist mask from a portion of the photoresist material;
    forming a three dimensional shape on the substrate from at least a portion of the dielectric material by utilizing the photoresist mask to protect at least a portion of the dielectric material the three dimensional shape having two side surfaces, two end surfaces, a top surface and a bottom surface, and the top surface has a top width and the bottom surface has a base width, and the base width is larger than the top width;
    depositing plasmonic material on at least one of the side surfaces wherein the plasmonic material deposited on the at least one side surface forms the tapered portion of the peg; and
    forming a complete NFT, the complete NFT comprising the tapered portion of the peg.

20. The method according to claim 19, wherein at least one of the side surfaces of the three dimensional shape has an angle from the top surface from about 30° to about 60.

* * * * *